(12) United States Patent
Tachibana et al.

(10) Patent No.: US 9,228,493 B2
(45) Date of Patent: Jan. 5, 2016

(54) HEAT SHIELD STRUCTURE AND ENGINE COVER

(71) Applicants: Ryoji Tachibana, Toyota (JP); Kenji Yamanari, Kariya (JP)

(72) Inventors: Ryoji Tachibana, Toyota (JP); Kenji Yamanari, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/421,027

(22) PCT Filed: Nov. 4, 2013

(86) PCT No.: PCT/IB2013/002746
§ 371 (c)(1),
(2) Date: Feb. 11, 2015

(87) PCT Pub. No.: WO2014/072817
PCT Pub. Date: May 15, 2014

(65) Prior Publication Data
US 2015/0198087 A1   Jul. 16, 2015

(30) Foreign Application Priority Data

Nov. 8, 2012   (JP) .................................. 2012-246317

(51) Int. Cl.

| | |
|---|---|
| *F01N 3/05* | (2006.01) |
| *F02B 77/11* | (2006.01) |
| *B60R 13/08* | (2006.01) |
| *F01N 13/10* | (2010.01) |
| *F01P 1/06* | (2006.01) |
| *F02M 37/04* | (2006.01) |
| *F28D 1/02* | (2006.01) |
| *F01P 1/10* | (2006.01) |
| *F01P 1/00* | (2006.01) |

(52) U.S. Cl.
CPC .............. *F02B 77/11* (2013.01); *B60R 13/0838* (2013.01); *B60R 13/0876* (2013.01); *F01N13/102* (2013.01); *F01P 1/06* (2013.01); *F02M 37/04* (2013.01); *F01N 2260/022* (2013.01); *F01N 2260/20* (2013.01); *F01P 1/10* (2013.01); *F01P 2001/005* (2013.01); *F28D 1/0233* (2013.01)

(58) Field of Classification Search
CPC .. F01N 2240/20; F01N 2260/022; F01P 1/10; F01P 2001/005; F28D 1/0233; F02B 77/11; F02M 25/0721

USPC .............. 60/320, 323; 123/41.7, 509, 198 E; 165/44

See application file for complete search history.

(56) References Cited

U.S. PATENT DOCUMENTS

| | | | |
|---|---|---|---|
| 3,363,710 A * | 1/1968 | Fager ....................... | F01P 1/10 123/294 |
| 4,539,945 A | 9/1985 | Bosisio | |
| 6,210,243 B1 * | 4/2001 | Nakase ................. | B63B 35/731 123/508 |
| 2007/0227509 A1 * | 10/2007 | Ueda ....................... | F01L 1/022 123/509 |

FOREIGN PATENT DOCUMENTS

| | | |
|---|---|---|
| DE | 2819609 | 11/1979 |
| JP | 63-002864 | 1/1988 |
| JP | 63-002865 | 1/1988 |
| JP | 6-22526 | 3/1994 |
| JP | 10-196393 | 7/1998 |
| JP | 2003-502908 | 5/2003 |
| JP | 2007-016650 | 1/2007 |
| JP | 2009-085121 | 4/2009 |
| JP | 2010-505019 | 10/2010 |

OTHER PUBLICATIONS

International Search Report Issued Apr. 9, 2014 in PCT/IB13/002746 filed Nov. 4, 2013.
Partial Translation of Office Action dated Sep. 5, 2014 in JP 2012-246317 filed Nov. 8, 2012.

* cited by examiner

*Primary Examiner* — Thomas Denion
*Assistant Examiner* — Jorge Leon. Jr.
(74) *Attorney, Agent, or Firm* — Oblon, McClelland, Maier & Neustadt, L.L.P.

(57) ABSTRACT

A heat shield structure includes an engine body having an exhaust manifold at its side portion, a fuel pump arranged above the engine body, and an engine cover. The engine cover includes a covering portion and a heat shield portion. The covering portion covers the fuel pump and the engine body from above. The heat shield portion protrudes downward from the covering portion. The heat shield portion partitions a space above the engine body and a space above the exhaust manifold from each other. The engine cover has an air guide passage between the engine body and the covering portion, the air guide passage extending from a front side of a vehicle toward the fuel pump.

8 Claims, 4 Drawing Sheets

HEAT SHIELD STRUCTURE AND ENGINE COVER

BACKGROUND OF THE INVENTION

1. Field of the Invention

The invention relates to a heat shield structure and an engine cover.

2. Description of Related Art

In a vehicle engine in which a fuel pump is arranged on a cylinder head cover, there is known a heat shield structure, in which a heat shield plate is provided on the cylinder head cover so as to surround the fuel pump in order to suppress an increase in the temperature of the fuel pump due to heat that is emitted from an exhaust manifold (for example, see Japanese Patent Application Publication No. 2009-085121 (JP 2009-085121 A)).

SUMMARY OF THE INVENTION

However, in the heat shield structure, the fuel pump is surrounded by the heat shield plate, so cold air flowing from a vehicle front side into an engine room is hard to blow against the fuel pump while the vehicle is traveling. Therefore, when fuel cut is carried out, high-temperature fuel stagnating inside the fuel pump may boil, with the result that it may not be possible to ensure restartability of an engine and drivability.

The invention provides a heat shield structure and an engine cover, which are able to reliably suppress an increase in the temperature of a fuel pump.

A first aspect of the invention provides a heat shield structure. The heat shield structure includes: an engine body having an exhaust manifold at a side portion thereof; a fuel pump arranged above the engine body; and an engine cover. The engine cover includes a covering portion and a heat shield portion. The covering portion covers the fuel pump and the engine body from above. The heat shield portion protrudes downward from the covering portion, and partitions a space above the engine body and a space above the exhaust manifold from each other. The engine cover has an air guide passage between the engine body and the covering portion, the air guide passage extending from a front side of a vehicle toward the fuel pump.

With this configuration, the heat shield structure includes the heat shield portion at the covering portion that constitutes the engine cover, the heat shield portion partitioning the space above the engine and the space above the exhaust manifold from each other. Therefore, heat that is emitted from the exhaust manifold is hard to propagate to the space above the engine body, so it is possible to suppress an increase in the temperature of the fuel pump.

In addition, the heat shield structure according to the above aspect of the invention has the air guide passage between the engine body and the covering portion that constitutes the engine cover, the air guide passage extending from the front side of the vehicle toward the fuel pump. Therefore, cold air flowing from the front side of the vehicle is caused to blow against the fuel pump, so it is possible to reliably suppress an increase in the temperature of the fuel pump.

In the heat shield structure according to the above aspect, the air guide passage may extend from around the fuel pump toward a rear side of the vehicle.

With this configuration, the heat shield structure according to the above aspect of the invention has the air guide passage that extends from around the fuel pump toward the rear side of the vehicle. Therefore, cold air flowing from the front side of the vehicle is caused to blow against the fuel pump and is then delivered toward the rear side of the vehicle, so air that has gained heat from the fuel pump does not stagnate around the fuel pump, and it is possible to effectively suppress an increase in the temperature of the fuel pump.

In the heat shield structure according to the above aspect, the air guide passage may extend from around the fuel pump toward a width direction of the vehicle.

With this configuration, the heat shield structure has the air guide passage that extends from around the fuel pump in the width direction of the vehicle. Therefore, cold air flowing from the front side of the vehicle is caused to blow against the fuel pump and is then delivered in the width direction of the vehicle, so air that has gained heat from the fuel pump does not stagnate around the fuel pump, and it is possible to effectively suppress an increase in the temperature of the fuel pump.

In the heat shield structure according to the above aspect, the engine cover may have a guide portion extending in a longitudinal direction of the vehicle, and the guide portion may be located inside the air guide passage.

With this configuration, in the heat shield structure, the guide portion extending in the longitudinal direction of the vehicle is provided at the engine cover so as to be located inside the air guide passage. Therefore, flow of cold air toward the fuel pump is regulated, so the fuel pump is efficiently cooled, and it is possible to effectively suppress an increase in the temperature of the fuel pump.

In the heat shield structure according to the above aspect, the engine cover may have a protruding portion at a vehicle front-side end portion of the engine cover, and the protruding portion may be configured to guide air to the air guide passage, the air flowing from the front side of the vehicle toward a rear side of the vehicle while the vehicle is traveling.

With this configuration, in the heat shield structure according to the aspect of the invention, the protruding portion that guides cold air, flowing from the front side of the vehicle toward the rear side of the vehicle during traveling, to the air guide passage is provided at the vehicle front-side end portion of the engine cover. Therefore, the air is collected to the air guide passage, so the fuel pump is efficiently cooled, and it is possible to effectively suppress an increase in the temperature of the fuel pump.

A second aspect of the invention provides an engine cover for covering an engine body and a fuel pump, the engine body having an exhaust manifold at a side portion of the engine body, and the fuel pump being arranged above the engine body. The engine cover includes: a covering portion covering the fuel pump and the engine body from above; and a heat shield portion protruding downward from the covering portion and partitioning a space above the engine body and a space above the exhaust manifold from each other. An air guide passage is defined by the fuel pump, the engine body, and the covering portion. The air guide passage extends from a front side of a vehicle toward the fuel pump.

According to the invention, it is possible to provide the heat shield structure and an engine cover, which are able to suppress an increase in the temperature of the fuel pump.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of a heat shield structure for a fuel pump according to the invention will be described with reference to the accompanying drawings. In FIG. 1 to FIG. 4, Fr indicates vehicle front side, Rr indicates vehicle rear side, Lh indicates vehicle left side and Rh indicates vehicle right side.

Figure 1:
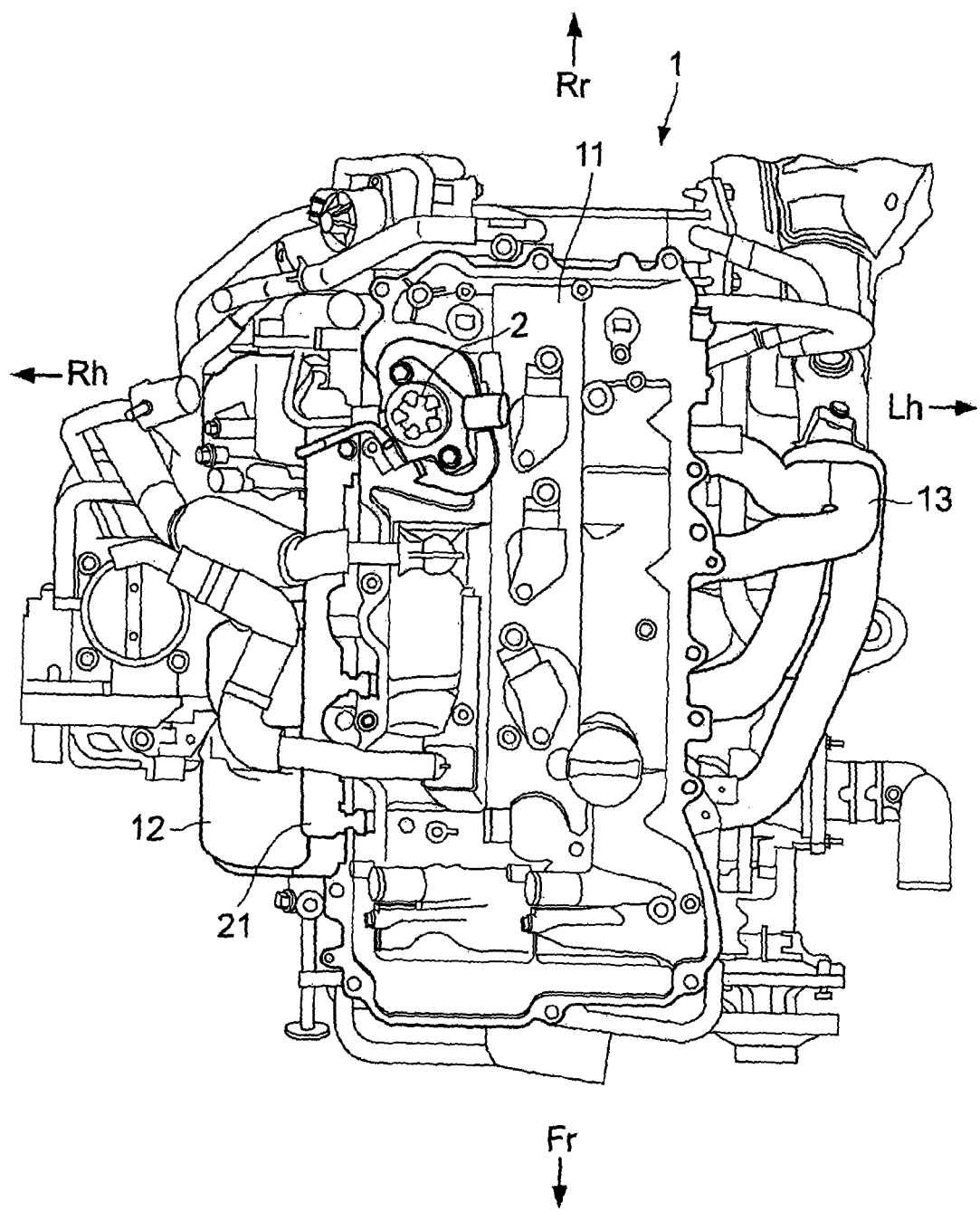
FIG. 1 is a schematic plan view of an engine to which a heat shield structure for a fuel pump according to an embodiment of the invention is applied.

An engine to which the heat shield structure for a fuel pump according to the present embodiment is applied includes an engine body 1 as shown in FIG. 1. The engine body 1 includes a cylinder block, an oil pan, a cylinder head, a cylinder head cover 11, and the like.

Among the components of the engine body 1, the cylinder block, the oil pan and the cylinder head are located under the cylinder head cover 11, so they are not shown in FIG. 1. A plurality of cylinders are formed in line inside the engine body 1. The engine body 1 is mounted in an engine room of the vehicle such that a crankshaft (not shown) supported by the cylinder block is oriented in a vehicle longitudinal direction.

An intake manifold 12 is connected to a side portion of the cylinder head of the engine body 1, facing the vehicle right side Rh. The intake manifold 12 serves to feed air via an air cleaner (not shown), a throttle valve (not shown), and the like, to the cylinders inside the engine body 1 as intake air.

An exhaust manifold 13 is connected to a side portion of the cylinder head of the engine body 1, facing the vehicle left side Lh. The exhaust manifold 13 serves to deliver burned gas, produced after air-fuel mixture has been burned, from the cylinders to the outside of the engine body 1 as exhaust gas. The exhaust gas is guided to a muffler (not shown) via an exhaust emission control device (not shown), and the like.

Furthermore, a fuel pump 2 is arranged on the cylinder head cover 11 of the engine body 1. The fuel pump 2 serves to increase the pressure of fuel. The fuel of which the pressure is increased by the fuel pump 2 is supplied to the cylinders inside the engine body 1 via a fuel delivery pipe 21, injectors (not shown), and the like.

The fuel pump 2 is located on the vehicle right side Rh of a center portion in a vehicle width direction on the cylinder head cover 11, and is located on the vehicle rear side Rr of a center portion in the vehicle longitudinal direction on the cylinder head cover 11.

Figure 2:
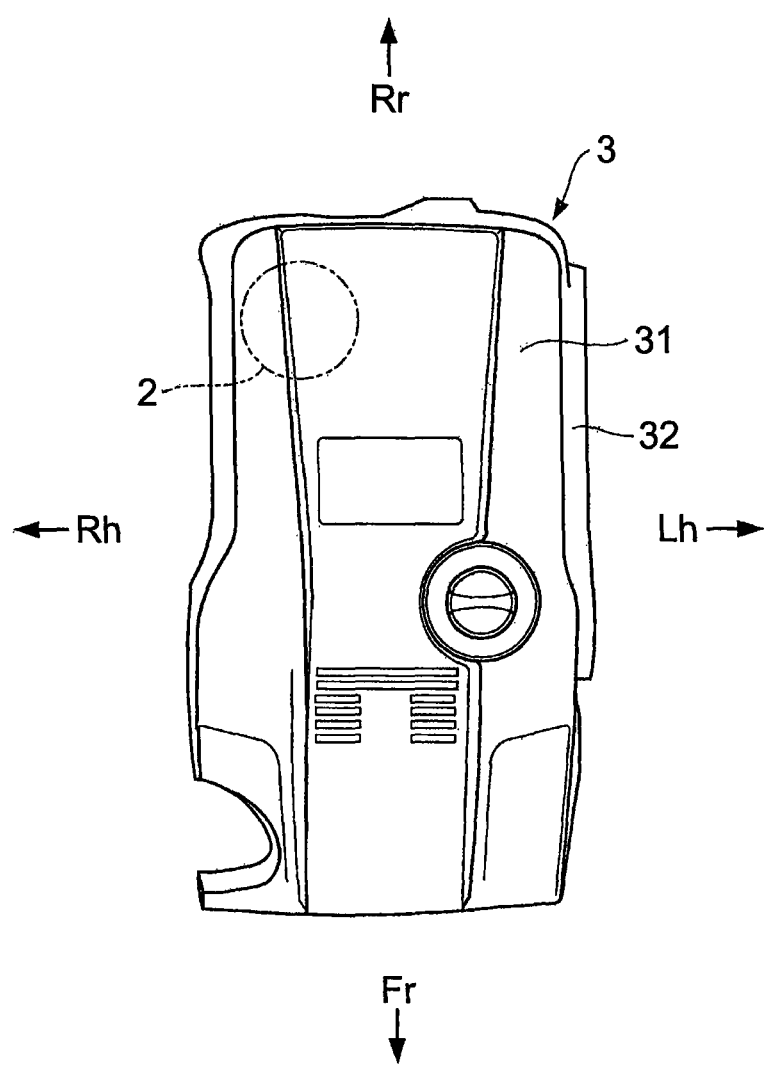
FIG. 2 is a schematic plan view of an engine cover in the heat shield structure for a fuel pump according to the embodiment of the invention.
Figure 3:
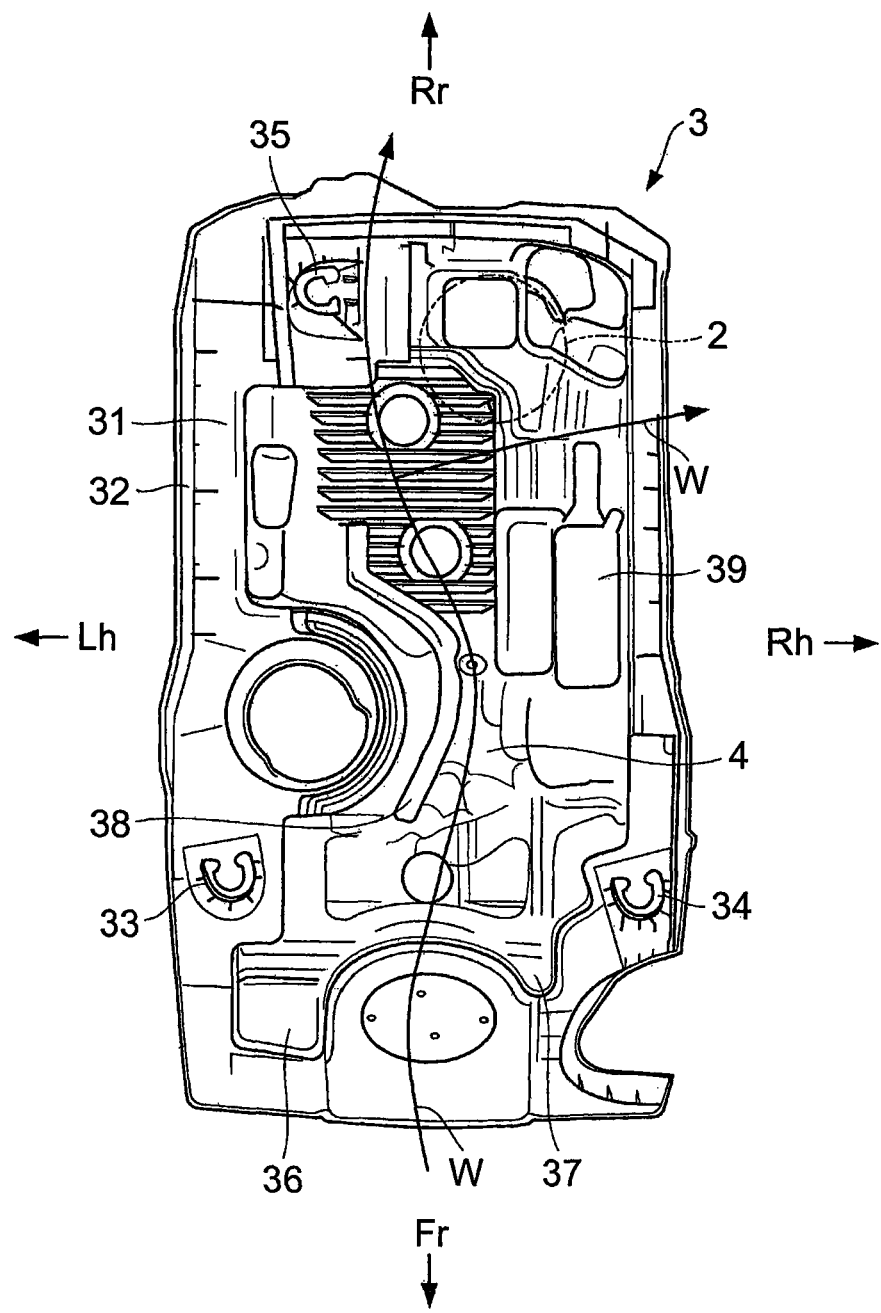
FIG. 3 is a schematic plan view that shows a state where the engine cover shown in FIG. 2 is inverted upside down.
Figure 4:
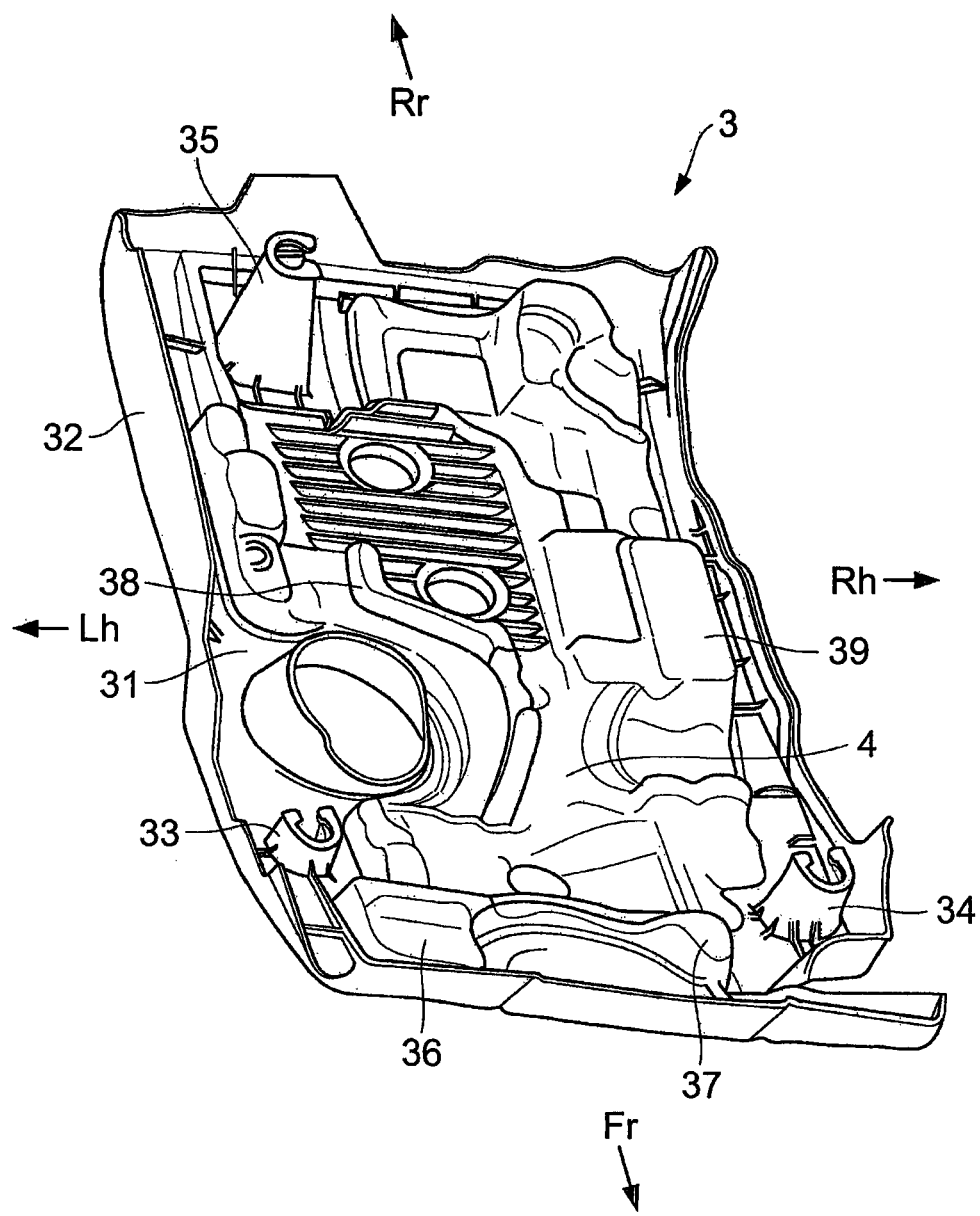
FIG. 4 is a schematic perspective view that shows a state where the engine cover shown in FIG. 2 is inverted upside down.

The heat shield structure for a fuel pump according to the present embodiment includes an engine cover 3 as shown in FIG. 2. As shown in FIG. 3 and FIG. 4, the engine cover 3 includes a covering portion 31, a heat shield portion 32 and support portions 33, 34, 35.

The covering portion 31 is a thin sheet member having a thickness in an up-and-down direction. The covering portion 31 faces the upper portion of the cylinder head cover 11, and is formed to entirely cover the cylinder head cover 11 including the fuel pump 2 from above. The covering portion 31 mainly serves to suppress emission of engine sound to the outside.

The heat shield portion 32 is a thin sheet member having a thickness in the vehicle width direction. The heat shield portion 32 protrudes downward from a vehicle left side Lh edge portion of the above-described covering portion 31, and is formed to partition a space above the cylinder head cover 11 and a space above the exhaust manifold 13 from each other. The heat shield portion 32 mainly serves to suppress propagation of heat, emitted from the exhaust manifold 13, to a space defined by the upper sides of the engine body 1 and cylinder head cover 11.

The support portions 33, 34, 35 protrude downward from the covering portion 31, and are formed to be coupled to the cylinder head cover 11.

The support portion 33 is located on the vehicle left side Lh of the center portion in the vehicle width direction on the lower side of the covering portion 31, and is located on the vehicle front side Fr of the center portion in the vehicle longitudinal direction on the lower side of the covering portion 31.

The support portion 34 is located on the vehicle right side Rh of the center portion in the vehicle width direction on the lower side of the covering portion 31, and is located on the vehicle front side Fr of the center portion in the vehicle longitudinal direction on the lower side of the covering portion 31.

The support portion 35 is located on the vehicle left side Lh of the center portion in, the vehicle width direction on the lower side of the covering portion 31, and is located on the vehicle rear side Rr of the center portion in the vehicle longitudinal direction on the lower side of the covering portion 31.

The covering portion 31, the heat shield portion 32 and the support portions 33, 34, 35 that constitute the engine cover 3 are integrally formed of a resin material, such as polyamide.

For example, a foam layer made of urethane is provided on the lower side of the covering portion 31, the side portion of the heat shield portion 32, facing the vehicle left side Lh, and boundary portions of them. The urethane foam layer contributes to improvement in the acoustic absorption, acoustic insulation, vibration insulation and thermal insulation of the engine cover 3.

The heat shield structure for a fuel pump according to the present embodiment is that an air guide passage 4 that extends from the, vehicle front side Fr toward the vehicle rear side Rr via around the fuel pump 2 is provided between both the fuel pump 2 and cylinder head cover 11 and the engine cover 3. The air guide passage 4 also extends from around the fuel pump 2 toward the vehicle right side Rh.

The air guide passage 4 is formed by changing the thickness of the urethane foam layer in the above-described covering portion 31 at portions of the covering portion 31. That is, portions of the urethane layer, having a thin thickness, mainly serve as the air guide passage 4.

Furthermore, protruding portions 36, 37, a guide portion 38 and a protrusion 39 are formed on the lower side of the covering portion 31 as thick portions at which the urethane foam layer is thick. The thick portions are not included in the air guide passage 4.

The protruding portion 36 is located close to a vehicle left side Lh edge portion with respect to the center portion in the vehicle width direction on the lower side of the covering portion 31, and is located closer to a vehicle front side Fr end portion on the lower side of the covering portion 31.

The protruding portion 37 is located closer to a vehicle right side Rh edge portion with respect to the center portion in the vehicle width direction on the lower side of the covering portion 31, and is located closer to the vehicle front side Fr end portion on the lower side of the covering portion 31.

The protruding portions 36, 37 serve to collect cold air W flowing from the vehicle front side Fr toward the air guide passage 4 and guide the cold air W into the air guide passage 4 while the vehicle is traveling.

The guide portion 38 is located at the center portion in the vehicle width direction on the lower side of the covering portion 31, and is located at the center portion in the vehicle longitudinal direction on the lower side of the covering portion 31. The guide portion 38 extends in a band-like shape in the vehicle longitudinal direction.

The protrusion 39 is located closer to the vehicle right side Rh edge portion on the lower side of the covering portion 31, and is located at the center portion in the vehicle longitudinal direction on the lower side of the covering portion 31.

The guide portion 38 serves to regulate flow of the cold air W from the vehicle front side Fr toward the vehicle rear side Rr inside the air guide passage 4 while the vehicle is traveling.

Next, the operation will be described.

In the engine to which the heat shield structure for a fuel pump according to the present embodiment is applied, the cold air W from the vehicle front side Fr flows into the air guide passage 4 between the cylinder head cover 11 and the engine cover 3 while the vehicle is traveling. At this time, the cold air W from the vehicle front side Fr toward the vehicle rear side Rr is collected by the protruding portions 36, 37, and is guided into the air guide passage 4.

The cold air W from the vehicle front side Fr toward the vehicle rear side Rr inside the air guide passage 4 is regulated in flow by the guide portion 38, and is guided to the outer surface of the fuel pump 2. Thus, the fuel pump 2 is cooled by the cold air W collected by the protruding portions 36, 37 and regulated in flow by the guide portion 38, so it is possible to reliably suppress an increase in the temperature of the fuel pump 2.

The cold air W that has blown against the fuel pump 2 and has cooled the fuel pump 2 is delivered toward the vehicle rear side Rr or the vehicle right side Rh. That is, air that has gained heat from the fuel pump 2 does not stagnate around the fuel pump 2, and an increase in the temperature of the fuel pump 2 is effectively suppressed.

In this way, in the engine to which the heat shield structure for a fuel pump according to the present embodiment is applied, even when fuel cut is carried out while the vehicle is traveling, the fuel pump 2 is exposed to the cold air W, so fuel that stagnates inside the fuel pump 2 does not boil.

Thus, the engine to which the heat shield structure for a fuel pump according to the present embodiment is applied is able to ensure restartability of the engine and drivability.

In the heat shield structure for a fuel pump according to the present embodiment, the heat shield portion 32 that partitions the space above the cylinder head cover 11 and the space above the exhaust manifold 13 from each other is provided at the covering portion 31 of the engine cover 3, so heat that is emitted from the exhaust manifold 13 is hard to propagate to the space above the cylinder head cover 11.

Thus, the engine to which the heat shield structure for a fuel pump according to the present embodiment is applied is able to suppress an increase in the temperature of the fuel pump 2 due to heat that is emitted from the exhaust manifold 13 while the vehicle is stopped.

The heat shield structure for a fuel pump according to the present embodiment is applied to a longitudinally mounted engine; instead, the heat shield structure for a fuel pump according to the invention may also be applied to a transversely mounted engine.

As described above, the heat shield structure for a fuel pump according to the invention has such an advantageous effect that it is possible to reliably suppress an increase in the temperature of the fuel pump and, as a result, it is possible to ensure the restartability of the engine and drivability, so it is useful for various types of engines.

The invention claimed is:

1. A heat shield structure for a fuel pump arranged above an engine body including an exhaust manifold at a side portion of the engine body, the heat shield structure comprising:
   an engine cover including a covering structure that covers the fuel pump and the engine body from above, wherein
   the covering structure is provided with a heat shield protruding downward from the covering structure and partitioning a space above the engine body and a space above the exhaust manifold from each other,
   an air guide passage is provided between the fuel pump and the covering structure, and is provided between the engine body and the covering structure, the air guide passage extending from a front side of a vehicle toward the fuel pump, and
   the engine cover is provided with a guide extending in a longitudinal direction of the vehicle, the guide being located inside the air guide passage.

2. The heat shield structure according to claim 1, wherein the air guide passage extends from around the fuel pump toward a rear side of the vehicle.

3. The heat shield structure according to claim 2, wherein the air guide passage extends from around the fuel pump in a width direction of the vehicle.

4. The heat shield structure according to claim 3, wherein a protruding structure is provided at a vehicle front-side end portion of the engine cover, and the protruding structure guides, to the air guide passage, cold air flowing from the front side of the vehicle toward a rear side of the vehicle while the vehicle is traveling.

5. The heat shield structure according to claim 2, wherein a protruding structure is provided at a vehicle front-side end portion of the engine cover, and the protruding structure guides, to the air guide passage, cold air flowing from the front side of the vehicle toward the rear side of the vehicle while the vehicle is traveling.

6. The heat shield structure according to claim 1, wherein the air guide passage extends from around the fuel pump in a width direction of the vehicle.

7. The heat shield structure according to claim 6, wherein a protruding structure is provided at a vehicle front-side end portion of the engine cover, and the protruding structure guides, to the air guide passage, cold air flowing from the front side of the vehicle toward a rear side of the vehicle while the vehicle is traveling.

8. The heat shield structure according to claim 1, wherein a protruding structure is provided at a vehicle front-side end portion of the engine cover, and the protruding structure guides, to the air guide passage, cold air flowing from the front side of the vehicle toward a rear side of the vehicle while the vehicle is traveling.

* * * * *